No. 679,850. Patented Aug. 6, 1901.
H. KRUEGER.
LINE GUIDE FOR REELS.
(Application filed Feb. 16, 1901.)

(No Model.)

Witnesses
C. H. Turner
Harry Kilgore

Inventor:
Henry Krueger.
By his Attorneys.
Williamson & Merchant

UNITED STATES PATENT OFFICE.

HENRY KRUEGER, OF MINNEAPOLIS, MINNESOTA.

LINE-GUIDE FOR REELS.

SPECIFICATION forming part of Letters Patent No. 679,850, dated August 6, 1901.

Application filed February 16, 1901. Serial No. 47,529. (No model.)

*To all whom it may concern:*

Be it known that I, HENRY KRUEGER, a citizen of the United States, residing at Minneapolis, in the county of Hennepin and State of Minnesota, have invented certain new and useful Improvements in Line - Guides for Reels; and I do hereby declare the following to be a full, clear, and exact description of the invention, such as will enable others skilled in the art to which it appertains to make and use the same.

My invention relates to fishing-reels, and has for its object to provide an improved line-guide of simple construction and small cost, which line-guide is adapted to be applied to reels already constructed and in use.

To the above ends the invention consists of the novel devices and combinations of devices hereinafter described, and defined in the claims.

The invention is illustrated in the accompanying drawings, wherein like characters indicate like parts throughout the several views.

Figure 1:
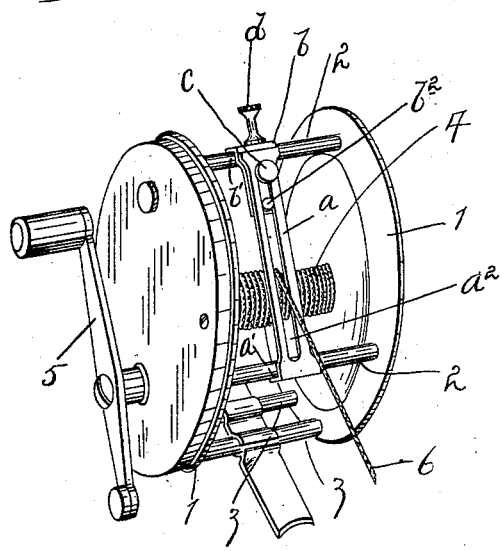
Figure 2:
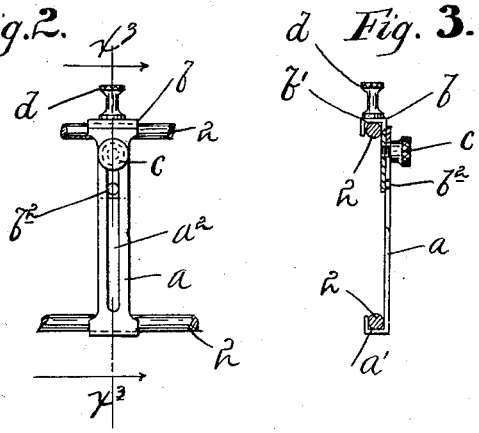
Figure 3:
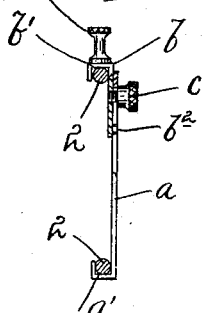

Figure 1 is a perspective view showing an ordinary reel with my improved line-guide applied in working position thereon. Fig. 2 is a detail showing the line-guide and portions of the spacing-rods of the reel to which it is applied; and Fig. 3 is a section on the line $x^3$ $x^3$ of Fig. 2, some parts being broken away.

Of the parts of the reel it is only desirable for the purposes of this case to enumerate the sides 1, connected by a plurality of spacing-rods 2 3, the reel-spool 4, and the crank 5. The numeral 6 indicates the line, which is wound upon the spool 4 in the ordinary manner.

My improved line-guide in its best form is made up of two sections $a$ and $b$, which sections are formed at their ends with open seats or bearings $a'$ $b'$, respectively, that are adapted to embrace and loosely slide upon the spacing-rods 2 of the reel. The guide-section $a$ is provided with a long slot $a^2$, through the upper end of which a guide pin or stud $b^2$ on the section $b$ loosely works. A thumb-screw $c$, the screw-threaded end of which works loosely through the slot $a^2$ and is screwed into the section $b$, coöperates with the stud $b^2$ to hold the sections $a$ and $b$ in straight line, and when tightened the said thumb-screw $c$ serves to rigidly lock the said sections $a$ and $b$ together. The member $b$ is further provided with a knob or thumb-piece $d$, the head of which is preferably knurled. This thumb-piece projects into a position where it may be readily engaged by the thumb of the hand which holds the handpiece of the fishing-pole, but does not interfere with the ordinary thumbing action of the spool when casting.

The line 6 as it extends from the spool 4 to the end of the pole runs through the guide-slot $a^2$ of the line-guide, and in the act of casting the said line-guide being free to slide on the rods 2 will be moved sidewise by the line as the line unwinds from the spool. Hence this line-guide does not under the casting action control the lateral unwinding movements of the line, but follows the line and permits it to take its natural unwinding course.

In winding up the line the thumb is placed on the thumb-piece $a'$ and the guide is moved laterally, so as to cause the line to wind on the spool in layers and without overlapping or tangling. The guide is controlled at the will of the operator and is not directly dependent on the rotation of the reel. Hence a line of any size may be properly wound upon the spool, and it may be given a more or less rapid tread or spiral advance at the will of the operator. By a little practice the operator will be able to wind the line as he may desire.

Automatic line-guides for reels have hitherto been provided; but such automatic devices are not only costly, intricate, and liable to get out of order, but they offer considerable resistance to the unwinding movement of the spool. Furthermore, they are not controllable at the will of the operator, but are directly dependent for their movements on the rotation of the spools.

As already indicated, one of the very important objects of my invention is to provide a line-guide for reels which may be adjusted to reels of different size and which may be applied in working position on the reel or, if desired, removed therefrom without taking the reel apart. As is evident, the guide above described fully meets all of the above requirements. As is evident, the longitudinal adjustment thereof adapts the same for application to reels in which the spacing-rods are located at different distances apart, and as the bearings or seats $a'$ $b'$ are open it is of course obvious that the guide may be applied to the spacing-rods of the reel simply by extending the sections thereof and then closing the said seats onto the said spacing-rods and securing the sections of the guide in their proper adjustments by means of the thumb-screw $c$.

By experience both with my improved line-guide and with so-called "automatic" line-guides I have found that a longer cast may be made with the former than with the latter. I have also found that backlashing of the line is prevented with my improved guide. This latter feature seems to be due to the fact that the line-guide extends close to the spool and is dragged by the line.

It will of course be understood that the device above described is capable of considerable modification within the scope of my invention.

It will be noted by reference particularly to Fig. 3 that the seats $a'$ and $b'$ of the members $a$ and $b$ are rectangular, so that they will engage the rods 2 at three points only. This reduces the friction approximately to the minimum and makes the line-guide much more easy to move.

What I claim, and desire to secure by Letters Patent of the United States, is as follows:

1. A reel having its sides connected by two or more spacing-rods, in combination a line-guide involving seats or bearings mounted to slide freely on a pair of said spacing-rods, a rigid connection between said bearings, provided with a longitudinally-extended line-passage, the upper of said bearings having a thumb-piece which projects upward and terminates in position to be engaged by the thumb of the hand which holds the reel, and which guide is adapted to be moved at will and independently of the movements of the reel-spool, substantially as described.

2. A line-guide for reels, adapted to be applied to the spacing-rods thereof, and provided with separable parts adapting the same to be applied to and removed from said spacing-rods without taking the reel apart, substantially as described.

3. A line-guide for reels, comprising a pair of longitudinally-adjustable sections provided with open seats, and adapted for application to the spacing-rods of the reel, substantially as described.

4. A line-guide for reels, comprising the sections $a$ and $b$, the former having the open seat $a'$ and slot $a^2$, and the latter having the open seat $b'$ and thumb-piece $d$, and the thumb-screw $c$ adjustably connecting the said sections, substantially as described.

5. The combination with a reel, having the spacing-rods 2, of the line-guide comprising the longitudinally-adjustable sections $a$ and $b$, the former having the open seat $a'$ and slot $a^2$, and the latter having the open seat $b'$ and thumb-piece $d$, the pin $b^2$ on said member $b$ working in the said slot $a^2$, and a thumb-screw $c$ working through said slot $a^2$ and screwed into said member $b$, for adjustably securing said members $a$ and $b$, substantially as described.

In testimony whereof I affix my signature in presence of two witnesses.

HENRY KRUEGER.

Witnesses:
MABEL M. McGRARY,
F. D. MERCHANT.